US008761265B2

(12) United States Patent
Luo et al.

(10) Patent No.: US 8,761,265 B2
(45) Date of Patent: Jun. 24, 2014

(54) HYPOTHETICAL REFERENCE DECODER FOR MULTIVIEW VIDEO CODING

(75) Inventors: Jiancong Luo, Plainsboro, NJ (US); Lihua Zhu, Beijing (CN); Peng Yin, West Windsor, NJ (US); Purvin Bibhas Pandit, Franklin Park, NJ (US)

(73) Assignee: Thomson Licensing, Boulogne-Billacourt (FR)

( * ) Notice: Subject to any disclaimer, the term of this patent is extended or adjusted under 35 U.S.C. 154(b) by 264 days.

(21) Appl. No.: 12/450,584

(22) PCT Filed: Apr. 14, 2008

(86) PCT No.: PCT/US2008/004821
§ 371 (c)(1),
(2), (4) Date: Oct. 1, 2009

(87) PCT Pub. No.: WO2008/130528
PCT Pub. Date: Oct. 30, 2008

(65) Prior Publication Data
US 2010/0091882 A1 Apr. 15, 2010

Related U.S. Application Data

(60) Provisional application No. 60/923,800, filed on Apr. 17, 2007.

(51) Int. Cl.
*H04N 7/12* (2006.01)
(52) U.S. Cl.
USPC ................................. 375/240.25; 375/240.01
(58) Field of Classification Search
None
See application file for complete search history.

(56) References Cited

U.S. PATENT DOCUMENTS

2005/0254575 A1    11/2005  Hannuksela et al.
2009/0296811 A1*   12/2009  Jeon et al. ................ 375/240.12

FOREIGN PATENT DOCUMENTS

| KR | 20060065553   | 6/2006 |
| WO | WO2006062377  | 6/2006 |
| WO | WO2007047736  | 4/2007 |
| WO | WO2007081926  | 7/2007 |
| WO | WO2007102665  | 9/2007 |

OTHER PUBLICATIONS

Vetro et al.:"Joint Draft 2.0 on Multiview Video Coding," Joint Video Team (JVT) of ISO/IEC MPEG & ITU-T VCEG, Doc. JVT-209, Jan. 13, 2007, pp. 1-28.
Zhu et al.:"SVC Hypothetical Reference Decoder," Joint Video Team (JVT) of ISO/IEC MPEG & ITU-T VCEG, doc. JVT-V068r2, Jan. 13, 2007, pp. 1-10.
Search report dated Jul. 13, 2009.

* cited by examiner

*Primary Examiner* — Donald Mills
(74) *Attorney, Agent, or Firm* — Robert D. Shedd; Xiaoan Lu

(57) ABSTRACT

A method and apparatus to define a Hypothetical Reference Decoder (HRD) for Multiview Video Coding (MVC) defines constraints for each possible interoperability point. Each combination of M views denotes an interoperability point. The principles of the present invention also allow for HRD constraints to be defined for a set of interoperability points and other sets are derived from the defined set. The method also allows for the HRD rules of the interoperability points to be derived from information in the bitstream syntax.

8 Claims, 13 Drawing Sheets

HYPOTHETICAL REFERENCE DECODER FOR MULTIVIEW VIDEO CODING

CROSS-REFERENCE TO RELATED APPLICATIONS

This application claims the benefit, under 35 U.S.C. §365 of International Application PCT/US2008/004821 filed Apr. 14, 2008 which was published in accordance with PCT Article 21(2) on Oct. 30, 2008 in English, and which claims the benefit of U.S. provisional patent application No. 60/923,800 filed Apr. 17, 2007.

TECHNICAL FIELD

This application relates to a hypothetical reference decoder for Multiview Video Coding in compressed video systems.

BACKGROUND

A hypothetical reference decoder (HRD) is valuable in compressed video systems because it serves to validate an encoded bitstream for compliance to a standard. In a coding standard such as H.264/AVC, there are numerous interoperability points within the Multiview Video Coding (MVC) feature of the standard. MVC allows the decoder to decode one or more views simultaneously, and decoding of one view may need information from other views. The H.264/AVC standard has rules (also referred to as requirements, constraints, or operational specifications) defining an HRD. The HRD conformance is a normative part of the H.264/MPEG-4 AVC standard. Any AVC bitstream has to be compliant to the HRD built according to the rules. Currently, there is no rule defined for a MVC HRD. Previous HRDs do not have sufficient rules to allow them to validate bitstreams like those of the MVC in AVC.

In many cases, the bit-rate variations of compressed bitstream need to be smoothed using buffering mechanisms at the encoder and decoder. The sizes of the physical buffers are finite, and hence the encoder constrains the bit-rate variations to fit within the buffer limitations. Video coding standards do not mandate specific encoder or decoder buffering mechanisms, but they require encoders to control bit-rate fluctuations so that a hypothetical reference decoder (HRD) (or Virtual Buffer Verifier (VBV)) of a given buffer size would decode the video bit stream without suffering from buffer overflow or underflow.

The HRD is based on an idealized decoder model. The purpose of a HRD is to place basic buffering constraints on the variations in bit-rate over time in a coded stream. These constraints in turn enable higher layers to multiplex the stream and cost-effective decoders to decode it in real-time. In the following discussion, H.264/AVC will be used as an example. However, the invention can be extended to other video coding models or standards.

SUMMARY OF THE INVENTION

This invention proposes several methods to define a Hypothetical Reference Decoder (HRD) for Multiview Video Coding (MVC).

In the current H.264/MPEG-4 AVC based implementation of MVC, the reference software achieves multi-view prediction by encoding each view with a single encoder and taking into consideration the cross-view references. Each view is coded as a separate bitstream by the encoder in its original resolution and later all the bitstreams are combined to form a single bitstream. At the decoder, a user can decode one or more views based on its application. In the current specification, no HRD rules are defined for MVC.

In MVC, assume there are N coded views in total. The decoder can have the flexibility to decode any M ($1 \leq M \leq N$) views simultaneously. Each combination of M views denotes an interoperability point (IOP). To allow the best flexibility, in this category, the present invention proposes that MVC HRD defines HRD constraints for each IOP. The problem with this solution is there are so many combinations, up to $(2^N-1)$. Even if a limitation is added for M, where $M \leq 32$, the total number of combinations is still big. The present invention describes methods to provide rules for a Hypothetical Reference Decoder for Multiview Video Coding where the rules are specified for each interoperable point.

DETAILED DESCRIPTION OF THE PREFERRED EMBODIMENT

In the current H.264/MPEG-4 AVC reference implementations, HRD related parameters are placed in sequence parameter set (SPS) and SEI messages. SPS contains the syntax structure VUI parameters, as illustrated in Table 1

TABLE 1

| Sequence Parameter Set | | |
| --- | --- | --- |
| seq_parameter_set_rbsp( ) { | C | Descriptor |
| profile_idc | 0 | u(8) |
| ... | | |
| sequence_parameter_set_id | 0 | ue(v) |
| ... | | |
| vui_parameters_present_flag | 0 | u(1) |
| if( vui_parameters_present_flag ) | | |
| vui_parameters( ) | | 0 |
| rbsp_trailing_bits( ) | | 0 |
| } | | | syntax elements num_units_in_tick, time_scale, fixed_frame_rate_flag and low_delay_hrd_flag and syntax structure HRD parameters are placed in the syntax structure VUI parameters, as shown in Table 2.

TABLE 2

| VUI parameters | | |
|---|---|---|
| ... | | |
| timing_info_present_flag | 0 | u(1) |
| if( timing_info_present_flag ) { | | |
|     num_units_in_tick | 0 | u(32) |
|     time_scale | 0 | u(32) |
|     fixed_frame_rate_flag | 0 | u(1) |
| } | | |
| nal_hrd_parameters_present_flag | 0 | u(1) |
| if( nal_hrd_parameters_present_flag ) | | |
|     hrd_parameters( ) | | |
| vcl_hrd_parameters_present_flag | 0 | u(1) |
| if( vcl_hrd_parameters_present_flag ) | | |
|     hrd_parameters( ) | | |
| if( nal_hrd_parameters_present_flag \|\| vcl_hrd_parameters_present_flag ) | | |
|     low_delay_hrd_flag | 0 | u(1) |
| ... | | |

Syntax structure HRD_parameters contains syntax to specify the buffer size and bit rate, etc.

The buffer period SEI and picture timing SEI specified the initial coded picture buffer removal delay before decoding a picture and the parameters to derive the timing of each picture.

Based on the current AVC implementation, the HRD related parameters placed in the SPS, in combine with the parameters placed in buffering period SEI and picture time SEI, a set of HRD constraints is defined for a H.264/MPEG-4 AVC bitstream.

However, the current AVC implementation only support one set of HRD parameters, which doesn't fit the multiple IOPs contained in the MVC bitstream.

Figure 2:
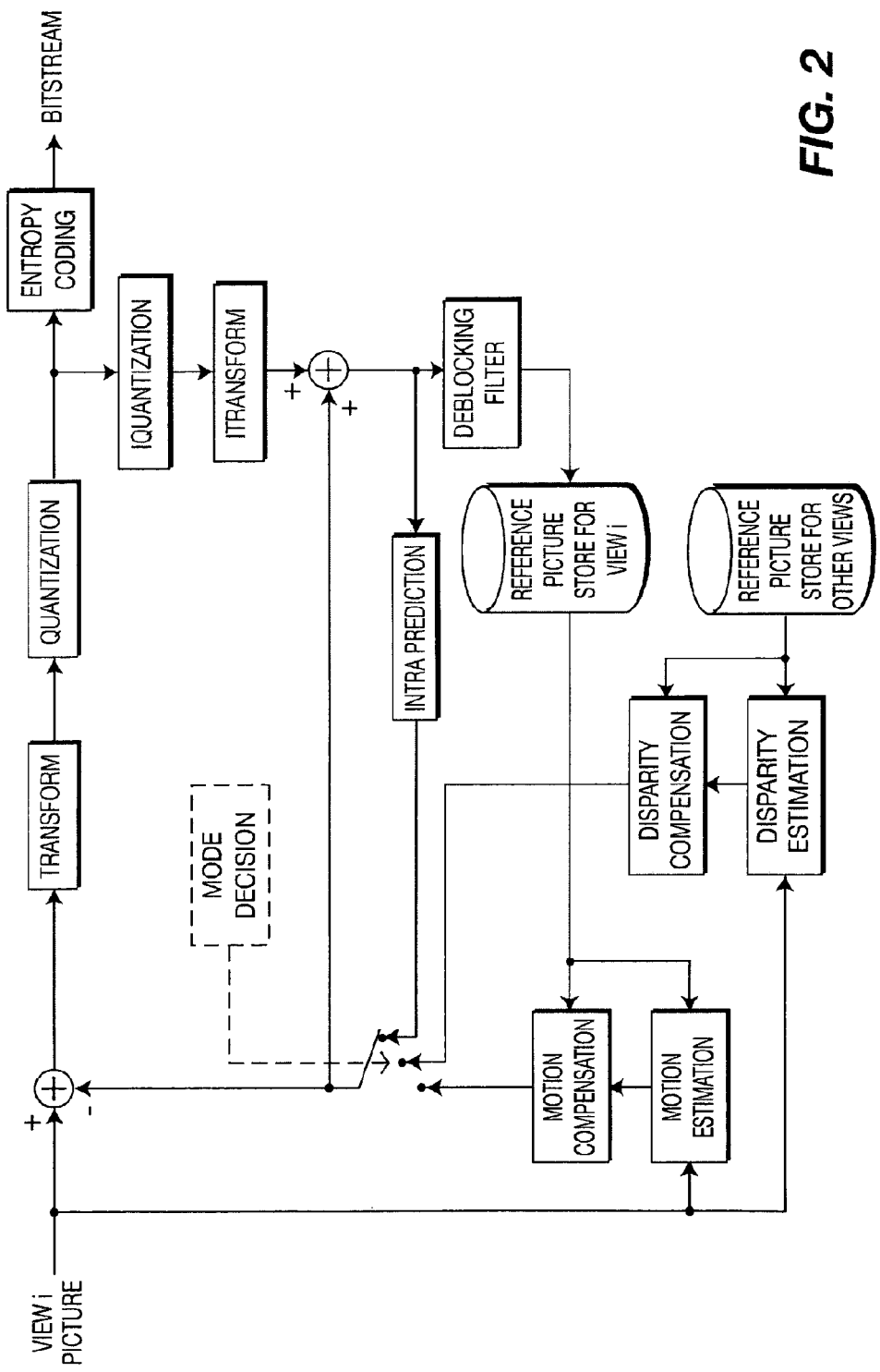
FIG. 2 shows a Multiview Video Coding encoder.
Figure 3:
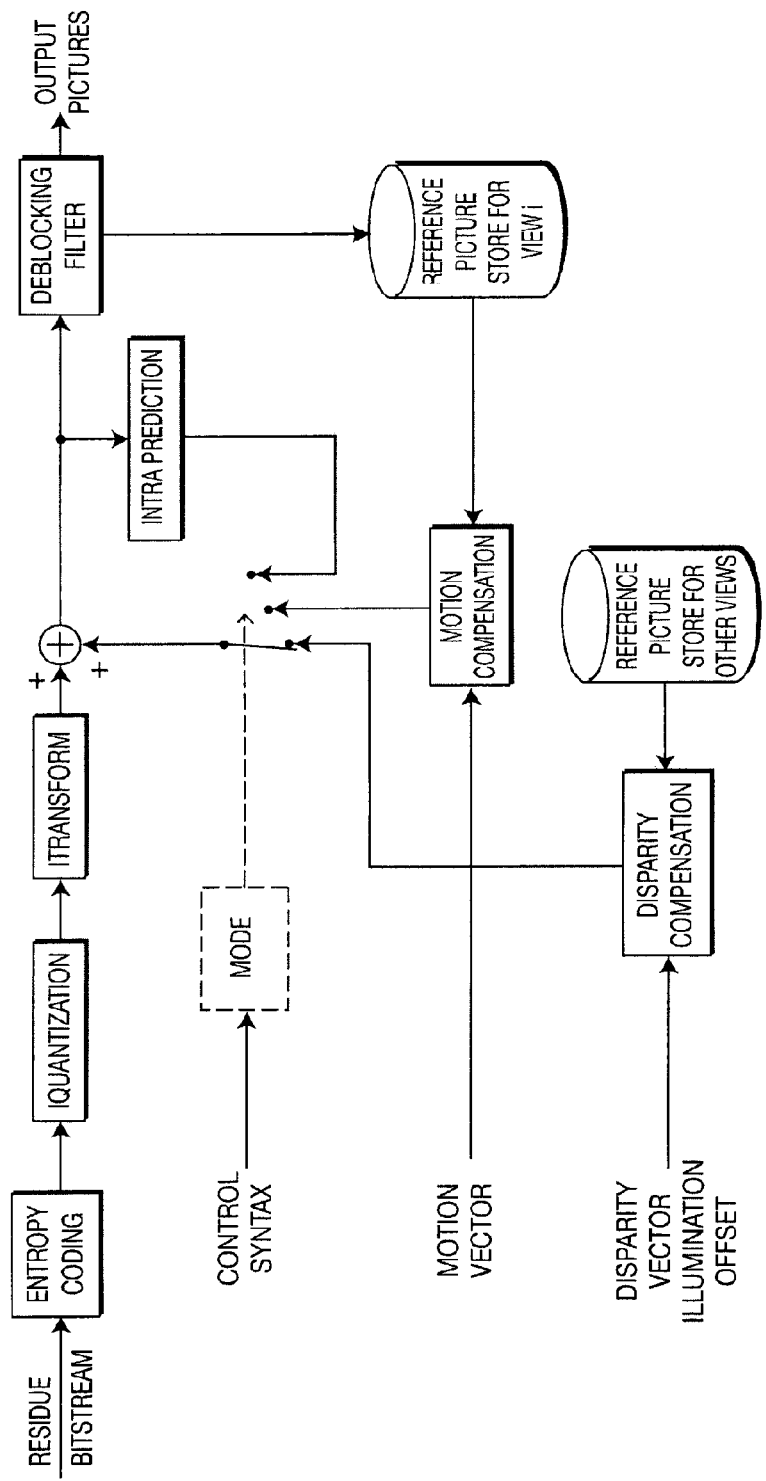
FIG. 3 shows a Multiview Video Coding decoder.

In the current H.264/MPEG-4 AVC based implementation of MVC, the reference software achieves multi-view prediction by encoding each view with a single encoder and taking into consideration the cross-view references. Each view is coded as a separate bitstream by the encoder in its original resolution and later all the bitstreams are combined to form a single bitstream. At decoder, the user can decode one or more views based on its application. The MVC encoder and decoder diagrams are shown in FIG. 2 and FIG. 3 respectively.

In the current specification, no HRD rules are defined for MVC.

In many of the described embodiments use the framework of H.264/MPEG-4 AVC based implementation of MVC. The similar idea can be applied to other video coding standards. For example, the feature of specifying particular parameters for one or more operating points (such as, an interoperability point) can be applied to standards other than the H.264/MPEG-4 AVC standard.

Three separate classes of implementations are described.

A. Specify HRD Rules for Each Interoperable Point in MVC

In MVC, assuming there are N coded views in total. The decoder can have the flexibility to decode any M ($1 \leq M \leq N$) views simultaneously. Each combination of M views denotes an interoperability point (IOP). To allow the best flexibility, in this category, the present invention proposes that a MVC HRD defines HRD constraints for each IOP. The problem with this solution is there are so many combinations, up to ($2^N-1$). Even if a limitation is added for M, where $M \leq 32$, the total number of combinations is still big.

An embodiment of this solution is presented below.

All combinations of views are combined in the following modifications to the AVC-HRD rules. Table 3 is taken from the AVC standard, and relates to the AVC-HRD.

Figure 4:
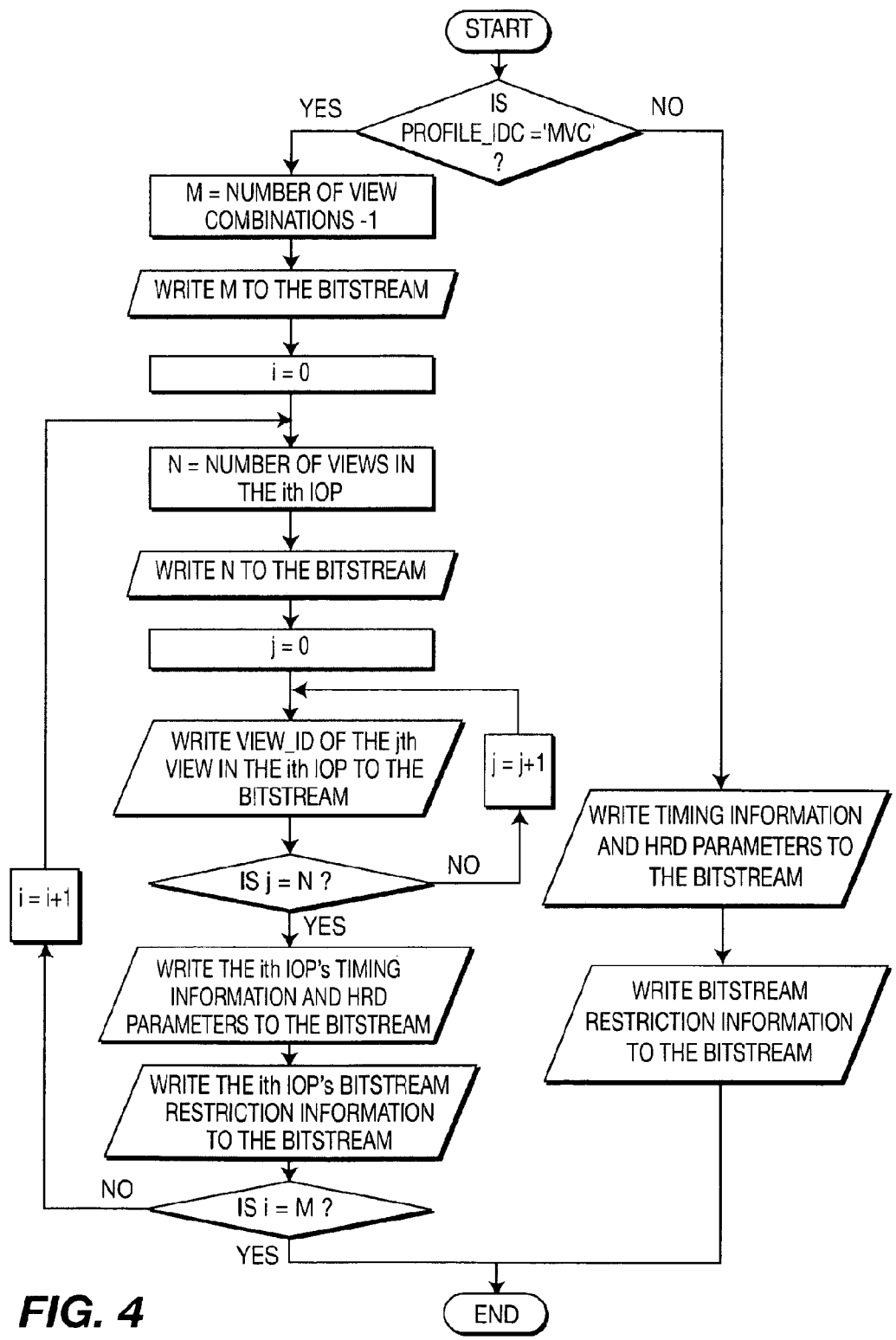
FIG. 4 shows Video Usability Information for MVC encoding process of category 1.
Figure 5:
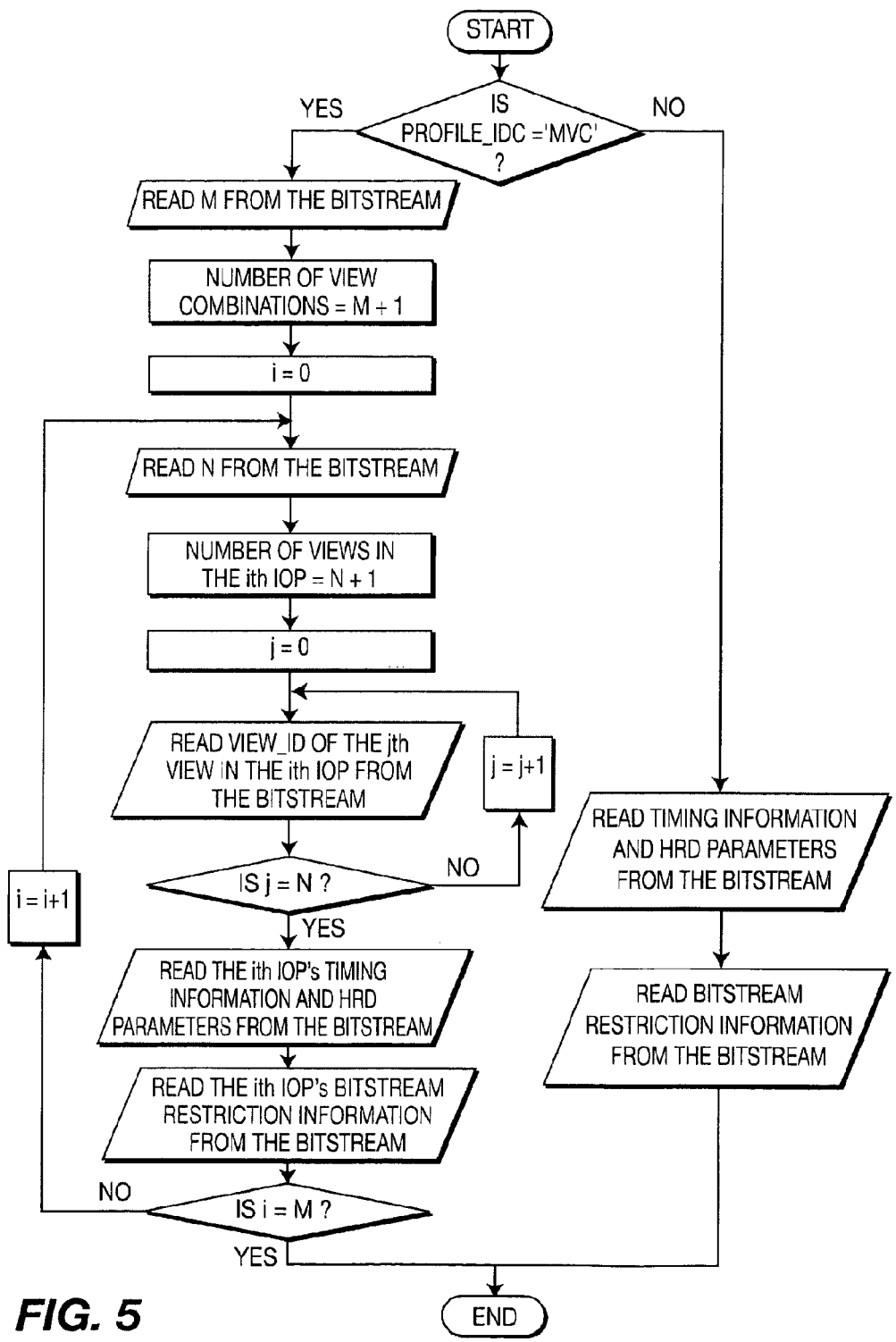
FIG. 5 shows Video Usability Information for MVC decoding process of category 1.
Figure 6:
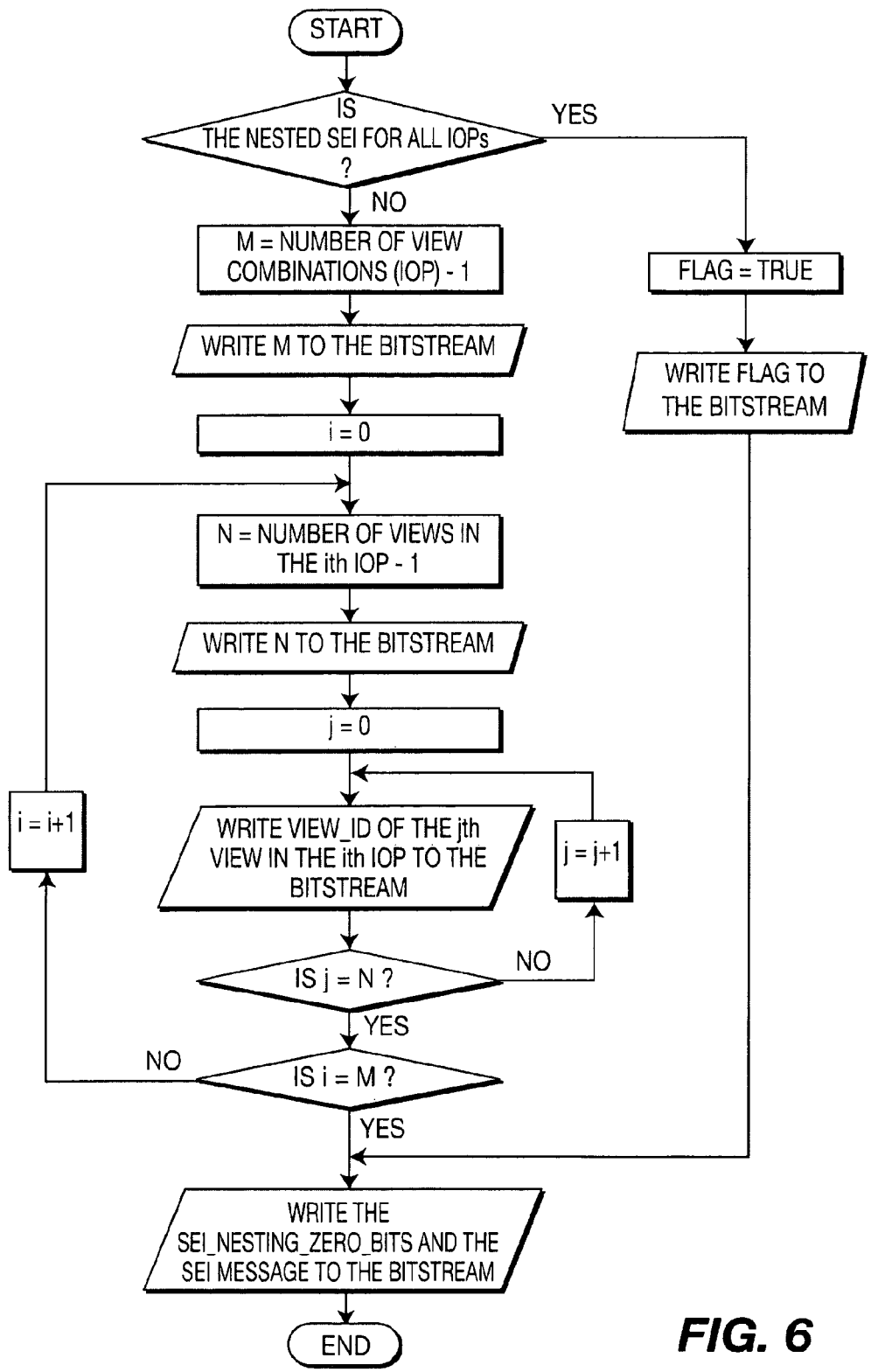
FIG. 6 shows Multiview nesting SEI encoding process of category 1.
Figure 7:
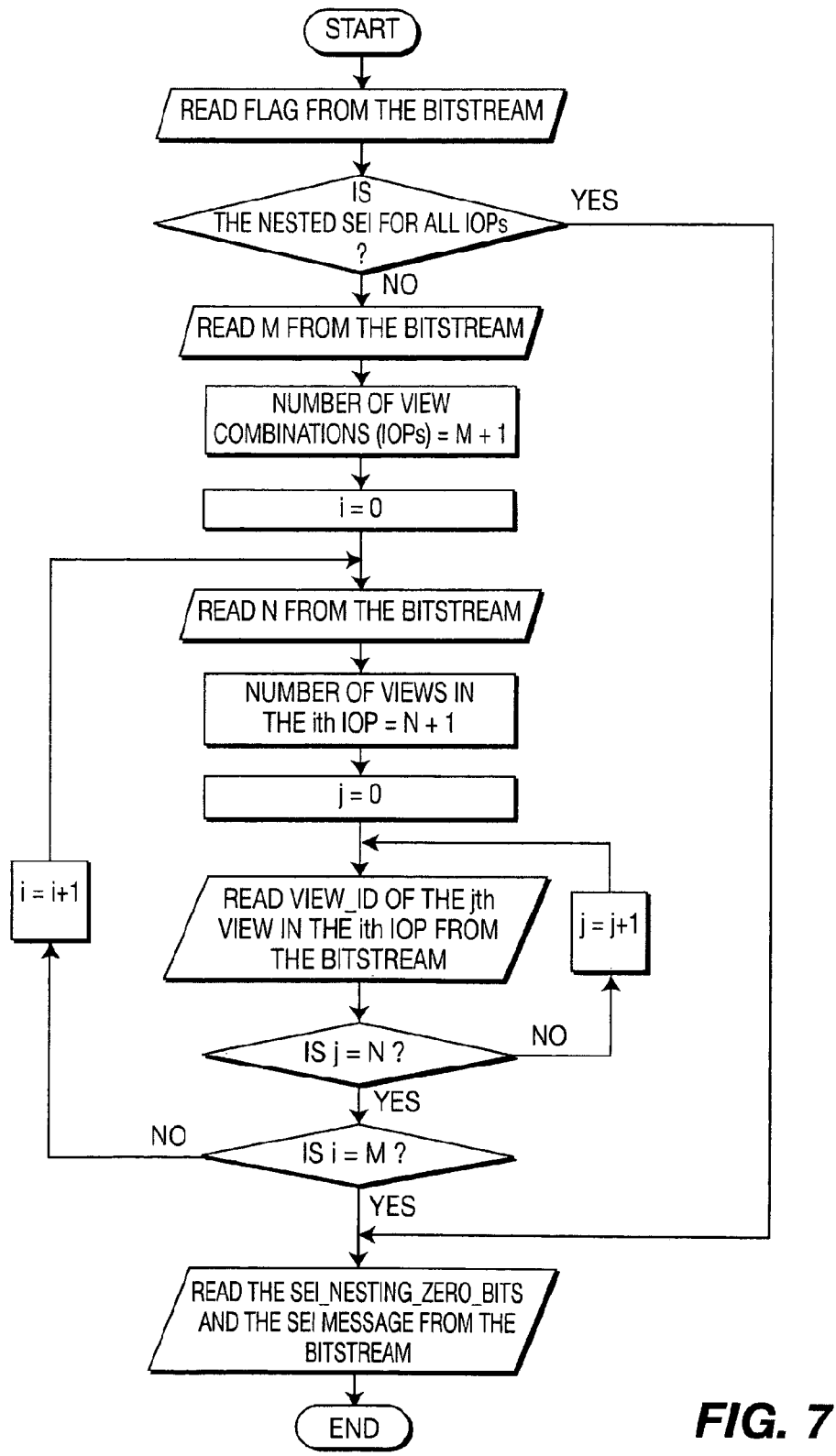
FIG. 7 shows Multiview nesting SEI decoding process of category 1.

The additions to the AVC standard Tables are shown using italic font. A new SEI message, multiview nesting SEI, is introduced in table 4. The flowchart of VUI encoding and decoding processes are shown in FIG. 4 and FIG. 5 respectively. And the flowchart of multiview nesting SEI encoding and decoding processes are shown in FIG. 6 and FIG. 7 respectively.

1. VUI parameters: As can be seen, Table 3 shows that syntax of VUI parameter in the AVC standard has been modified by introducing an "if-then" statement that tests the variable "profile_idc". If "profile_idc" is equal to "MVC", then a loop if performed one or more times to test one or more points (that is, IOPs). If "profile_idc" is not equal to "MVC", then "AVC" is presumed to be the relevant standard, and an "else" is executed to test one point for AVC compliance (using existing AVC-HRD rules). Lines 30-60 are executed if the "profile_idc" is MVC, otherwise, lines 63-88 are executed. The variable "num_view_combinations_minus1" (line 30) provides the number of IOPs in the loop. Within the main loop, a sub-loop for each IOP (lines 33-34) provides the view ids associated with the IOP. For each sub-loop, "num_views_minus1[i]" (line 32) provides the number of views associated with the ith IOP, and "view_id[i][j]" (line 34) provides the view_id of the jth view of the ith IOP. Lines 35-59 provide syntaxes for the ith IOP. There can be up to ($2^N-1$) IOPs for an MVC bitstream. This compares to a single checking point for an AVC bitstream.

2. A new SEI message, multiview nesting SEI, is defined in Table 4. A multiview nesting SEI message concerns an access unit. A multiview nest SEI message contains one and only one SEI message, which is referred to as the nested SEI message. The scope to which the nested SEI message applies is indicated by the syntaxes from lines 2-10. "num_view_combinations_minus1", "num_views_minus1[i]" and "view_id[i][j]" share the same semantics of those in the VUI parameters.

3. Buffering period SEI message and the Picture timing SEI message (which are part of AVC) can be implemented as a SEI message payload embedded in multiview nesting SEI message. The syntax of Buffering period SEI and Picture timing SEI remain the same as in AVC. The Buffering period SEI message and the Picture timing SEI messages for the AVC compatible view shall not be nested in the multiview nesting SEI. This allows for AVC compatibility.

TABLE 3

VUI parameters syntax

| | | C | Descriptor |
|---|---|---|---|
| 1 | vui_parameters( ) { | | |
| 2 |   aspect_ratio_info_present_flag | 0 | u(1) |
| 3 |   if( aspect_ratio_info_present_flag ) { | | |
| 4 |     aspect_ratio_idc | 0 | u(8) |
| 5 |     if( aspect_ratio_idc = = Extended_SAR ) { | | |
| 6 |       sar_width | 0 | u(16) |
| 7 |       sar_height | 0 | u(16) |
| 8 |     } | | |
| 9 |   } | | |
| 10 |   overscan_info_present_flag | 0 | u(1) |
| 11 |   if( overscan_info_present_flag ) | | |
| 12 |     overscan_appropriate_flag | 0 | u(1) |
| 13 |   video_signal_type_present_flag | 0 | u(1) |
| 14 |   if( video_signal_type_present_flag ) { | | |
| 15 |     video_format | 0 | u(3) |
| 16 |     video_full_range_flag | 0 | u(1) |
| 17 |     colour_description_present_flag | 0 | u(1) |
| 18 |     if( colour_description_present_flag ) { | | |
| 19 |       colour_primaries | 0 | u(8) |
| 20 |       transfer_characteristics | 0 | u(8) |
| 21 |       matrix_coefficients | 0 | u(8) |
| 22 |     } | | |
| 23 |   } | | |
| 24 |   chroma_loc_info_present_flag | 0 | u(1) |
| 25 |   if( chroma_loc_info_present_flag ) { | | |
| 26 |     chroma_sample_loc_type_top_field | 0 | ue(v) |
| 27 |     chroma_sample_loc_type_bottom_field | 0 | ue(v) |
| 28 |   } | | |
| 29 |   if( profile_idc == 'MVC) { | | |
| 30 |     num_view_combinations_minus1 | 0 | ue(v) |
| 31 |     for( i = 0; i <= num_view_combinations_minus1; i++ ) { | | |
| 32 |       num_views_minus1[ i ] | 0 | u(5) |
| 33 |       for(j = 0; j <= num_views_minus1[ i ]; j++ ) | | |
| 34 |         view_id[ i ][j] | 0 | u(5) |
| 35 |       timing_info_present_flag[ i ] | 0 | u(1) |
| 36 |       if( timing_info_present_flag[ i ] ) { | | |
| 37 |         num_units_in_tick[ i ] | 0 | u(32) |
| 38 |         time_scale[ i ] | 0 | u(32) |
| 39 |         fixed_frame_rate_flag[ i ] | 0 | u(1) |
| 40 |       } | | |
| 41 |       nal_hrd_parameters_present_flag[ i ] | 0 | u(1) |
| 42 |       if( nal_hrd_parameters_present_flag[ i ] ) | | |
| 43 |         hrd_parameters( ) | | |
| 44 |       vcl_hrd_parameters_present_flag[ i ] | 0 | u(1) |
| 45 |       if( vcl_hrd_parameters_present_flag[ i ]) | | |
| 46 |         hrd_parameters( ) | | |
| 47 |       if( nal_hrd_parameters_present_flag[ i ] \|\| vcl_hrd_parameters_present_flag[ i ] ) | | |
| 48 |         low_delay_hrd_flag[ i ] | 0 | u(1) |
| 49 |       pic_struct_present_flag[ i ] | 0 | u(1) |
| 50 |       bitstream_restriction_flag | 0 | u(1) |
| 51 |       if( bitstream_restriction_flag ) { | | |
| 52 |         motion_vectors_over_pic_boundaries_flag | 0 | u(1) |
| 53 |         max_bytes_per_pic_denom | 0 | ue(v) |
| 54 |         max_bits_per_mb_denom | 0 | ue(v) |
| 55 |         log2_max_mv_length_horizontal | 0 | ue(v) |
| 56 |         log2_max_mv_length_vertical | 0 | ue(v) |
| 57 |         num_reorder_frames | 0 | ue(v) |
| 58 |         max_dec_frame_buffering | 0 | ue(v) |
| 59 |       } | | |
| 60 |     } | | |
| 61 |   } | | |
| 62 |   else{ | | |
| 63 |     timing_info_present_flag | 0 | u(1) |
| 64 |     if( timing_info_present_flag ) { | | |
| 65 |       num_units_in_tick | 0 | u(32) |
| 66 |       time_scale | 0 | u(32) |
| 67 |       fixed_frame_rate_flag | 0 | u(1) |
| 68 |     } | | |
| 69 |     nal_hrd_parameters_present_flag | 0 | u(1) |
| 70 |     if( nal_hrd_parameters_present_flag ) | | |
| 71 |       hrd_parameters( ) | | |
| 72 |     vcl_hrd_parameters_present_flag | 0 | u(1) |
| 73 |     if( vcl_hrd_parameters_present_flag ) | | |
| 74 |       hrd_parameters( ) | | |
| 75 |     if( nal_hrd_parameters_present_flag \|\| vcl_hrd_parameters_present_flag ) | | |
| 76 |       low_delay_hrd_flag | 0 | u(1) |
| 77 |     pic_struct_present_flag | 0 | u(1) |

TABLE 3-continued

VUI parameters syntax

| | | C | Descriptor |
|---|---|---|---|
| 1 | vui_parameters( ) { | | |
| 78 | bitstream_restriction_flag | 0 | u(1) |
| 79 | if( bitstream_restriction_flag ) { | | |
| 80 | motion_vectors_over_pic_boundaries_flag | 0 | u(1) |
| 81 | max_bytes_per_pic_denom | 0 | ue(v) |
| 82 | max_bits_per_mb_denom | 0 | ue(v) |
| 83 | log2_max_mv_length_horizontal | 0 | ue(v) |
| 84 | log2_max_mv_length_vertical | 0 | ue(v) |
| 85 | num_reorder_frames | 0 | ue(v) |
| 86 | max_dec_frame_buffering | 0 | ue(v) |
| 87 | } | | |
| 88 | } | | |
| 89 | } | | | num_view_combinations_minus1 plus 1 indicates the number of view combinations supported by the bitstream referring to the same seq_parameter_set_id in the SPS which contains this hrd_parameters( ).

num_views_minus1[i] indicates the number of views associated with the ith IOP.

view_id[i][j] indicates the view_id of the jth view of the ith IOP.

timing_info_present_flag[i] specifies the timing_info_present_flag value of the ith IOP.

num_units_in_tick[i] specifies the num_units_in_tick value of the ith IOP.

time_scale[i] specifies the time_scale value of the ith IOP.

fixed_frame_rate_flag[i] specifies the fixed_frame_rate_flag value of the ith IOP.

nal_hrd_parameters_present_flag[i] specifies the nal_hrd_parameters_present_flag value of the ith IOP.

vcl_hrd_parameters_present_flag[i] specifies the vcl_hrd_parameters_present_flag value of the ith IOP.

low_delay_hrd_flag[i] specifies the low_delay_hrd_flag value of the ith IOP.

pic_struct_present_flag[i] specifies the pic_struct_present_flag value of the ith IOP.

timing_info_present_flag, num_units_in_tick, time_scale, nal_hrd_parameters_present_flag, vcl_hrd_parameters_present_flag, low_delay_hrd_flag and pic_struct_present_flag have the same semantics as in AVC.

equal to 0 indicates that the applicable scope of the nested SEI message is signaled by the syntax elements num_view_combinations_minus1, num_views_minus1[i] and view_id[i][j].

num_view_combinations_minus1 plus 1 indicates the number of view combinations supported by the bitstream.

num_views_minus1[i] indicates the number of views associated with the ith IOP.

view_id[i][j] indicates the view_id of the jth view of the ith IOP.

B. Specify HRD Rules Only for a Set of IOPs

In this category, it is proposed to define MVC HRD for a set of IOPs, and derive other sets of IOPs from this set. In one embodiment is a proposal that MVC HRD only defines HRD constraints for decoding each of the possible single views, and the HRD parameters for decoding more than one view is derived from the relevant single view parameters. This approach allows one to send fewer parameters than the first approach, but it adds more complexity for derivation.

Figure 8:
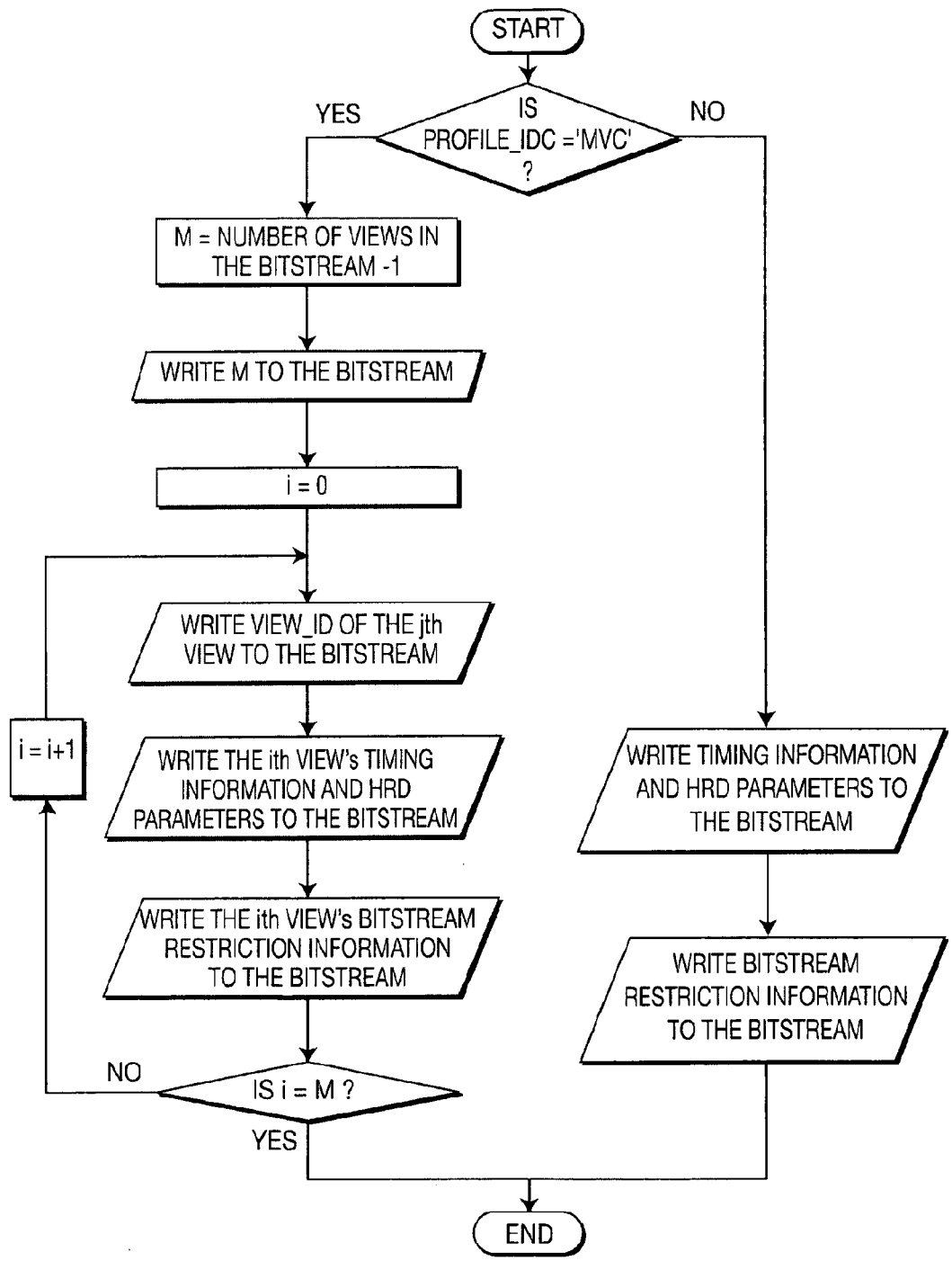
FIG. 8 shows Video Usability Information for MVC encoding process of category 2.
Figure 9:
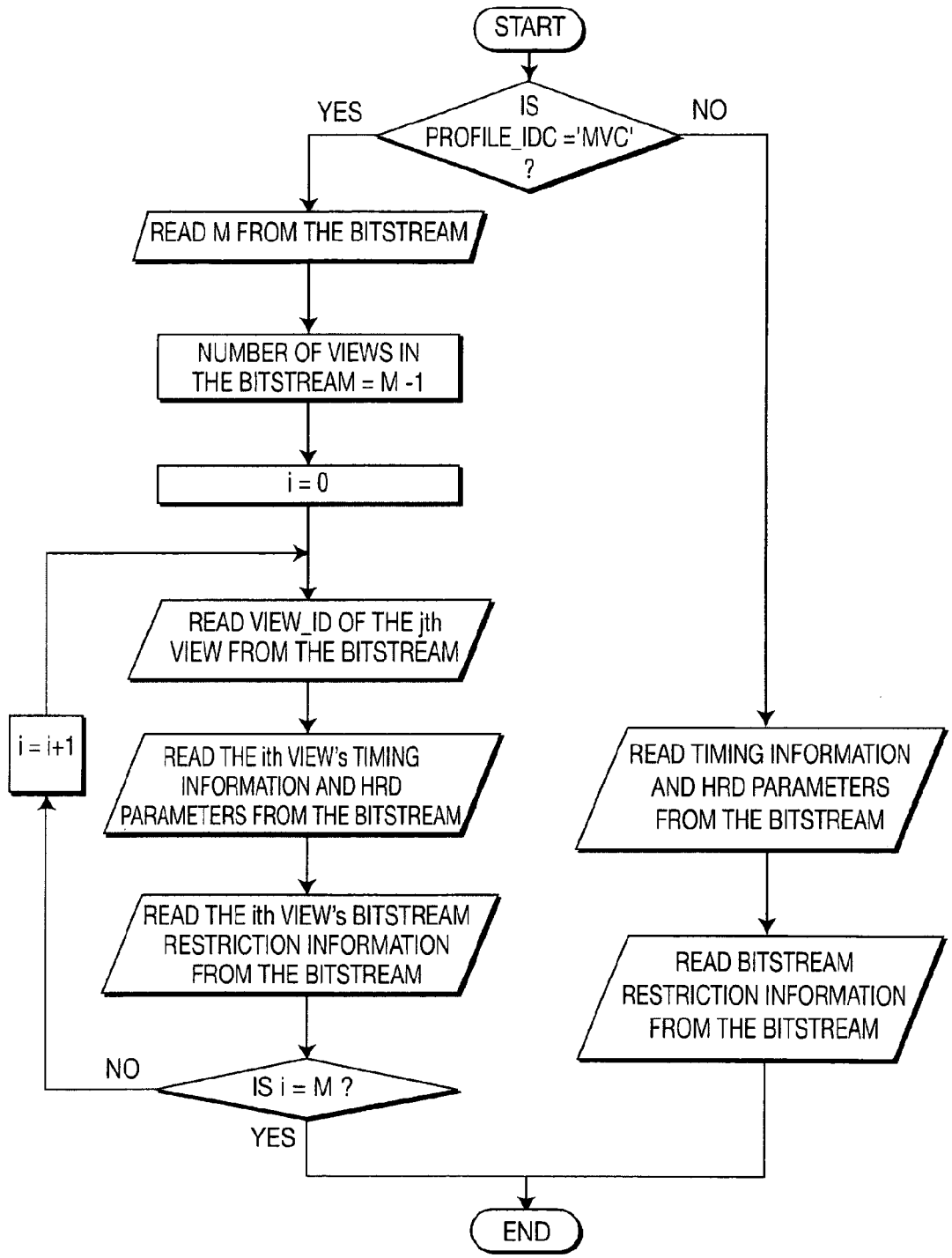
FIG. 9 shows Video Usability Information for MVC decoding process of category 2.
Figure 10:
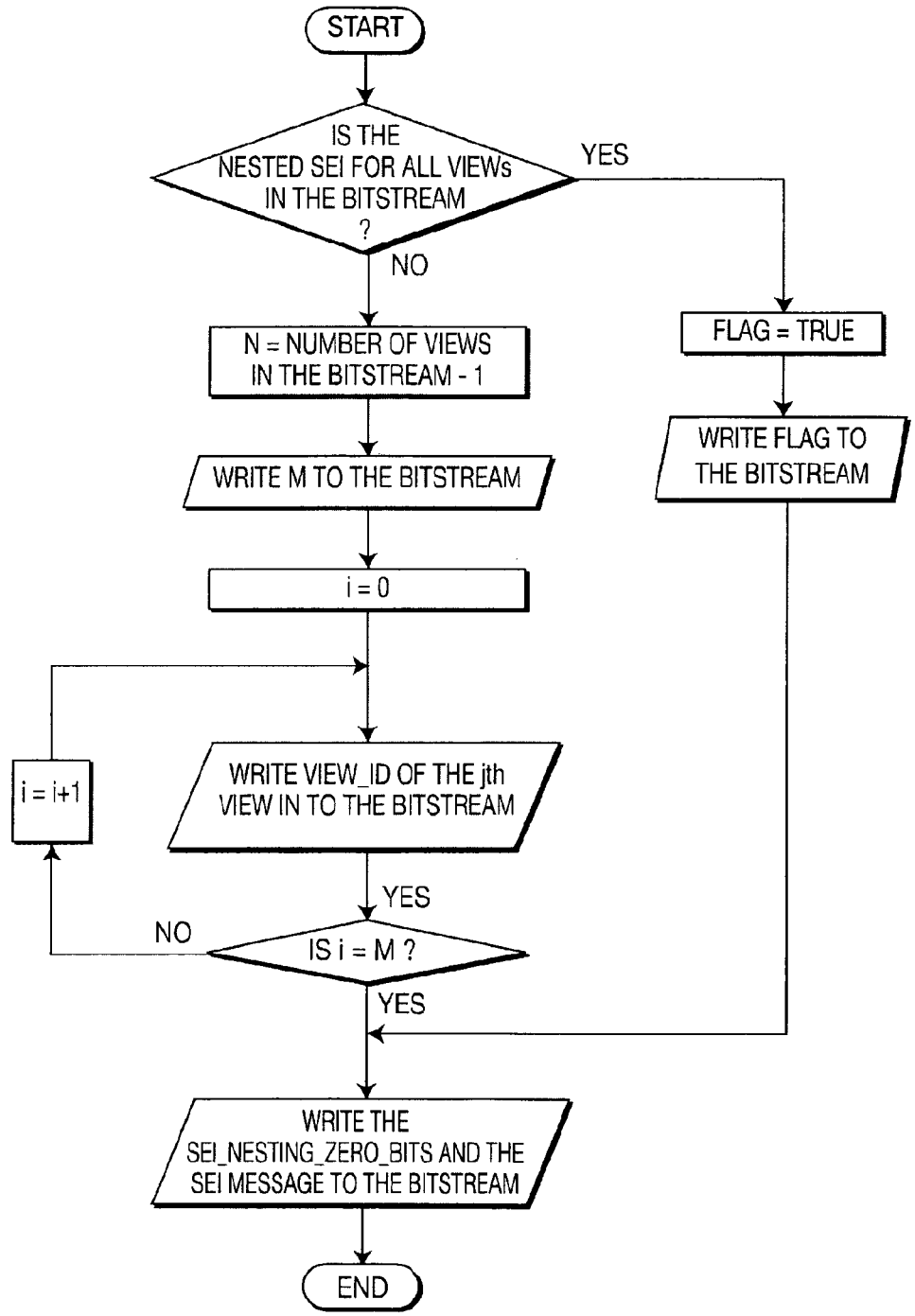
FIG. 10 shows Multiview nesting SEI encoding process of category 2 & 3.
Figure 11:
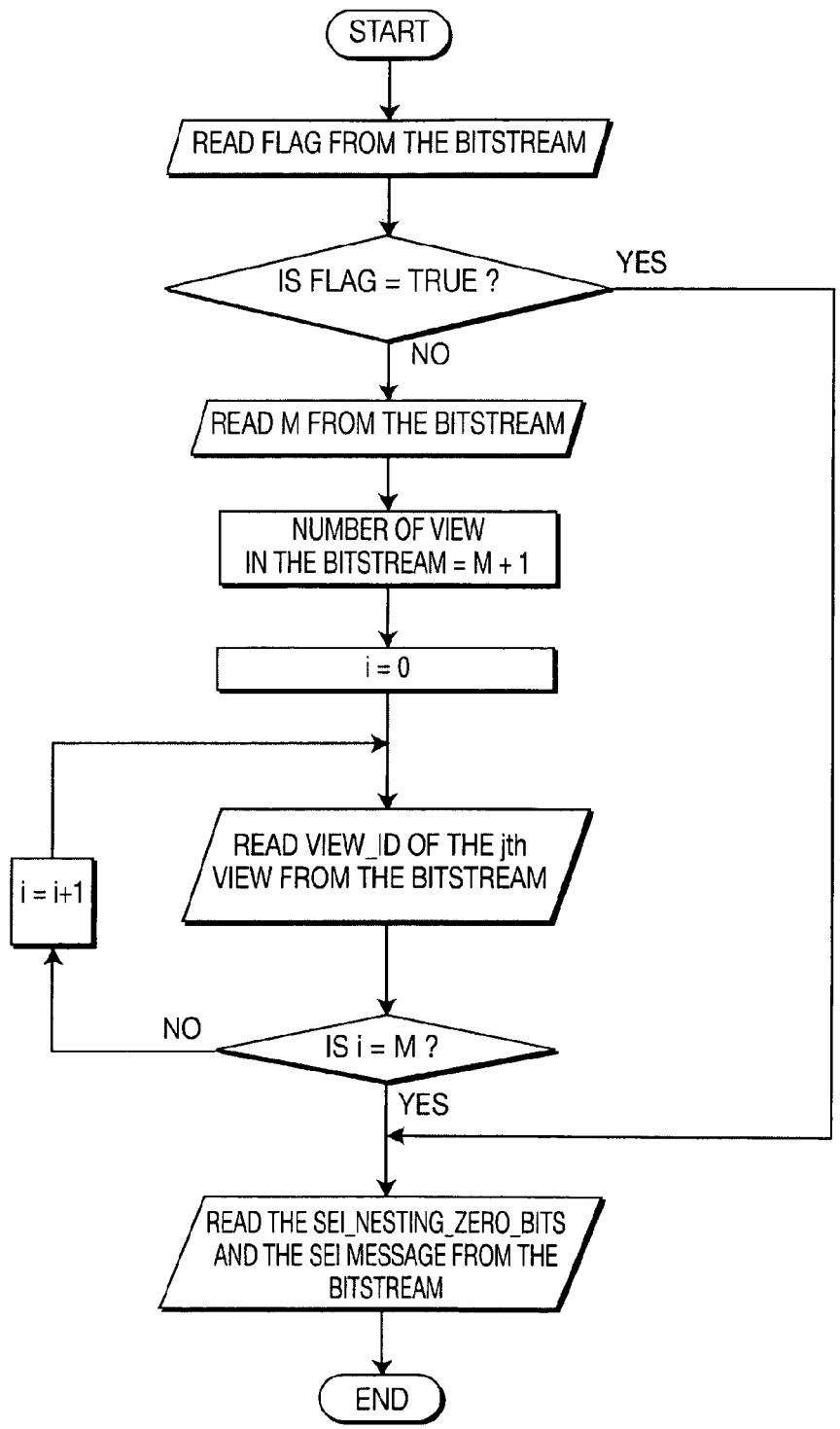
FIG. 11 shows Multiview nesting SEI decoding process of category 2 & 3.

An embodiment of this solution is presented below:

An HRD is defined for each view. The maximum number of sets of HRD parameters sending is M, where M=1 . . . N. So, if there are N views, this embodiment would send N sets of HRD parameters. The flowchart of VUI encoding and decoding processes are shown in FIG. 8 and FIG. 9 respectively. And the flowchart of multiview nesting SEI encoding and decoding processes are shown in FIG. 10 and FIG. 11 respectively.

TABLE 4

Multiview nesting SEI message syntax

| | | C | Descriptor |
|---|---|---|---|
| 1 | multiview_nesting( payloadSize ) { | | |
| 2 | all_view_combinations_in_au_flag | 5 | u(1) |
| 3 | if(all_view_combinations_in_au_flag = = 0) { | | |
| 4 | num_view_combinations_minus1 | 5 | ue(v) |
| 5 | for( i = 0; i <= num_view_combinations_minus1; i++ ) { | | |
| 6 | num_views_minus1 [ i ] | 0 | u(5) |
| 7 | for( j = 0; j <= num_views_minus1 [ i ]; j++ ) | | |
| 8 | view_id[ i ][j] | 0 | u(5) |
| 9 | } | | |
| 10 | } | | |
| 11 | while( !byte_aligned( ) ) | | |
| 12 | sei_nesting_zero_bit /* equal to 0 */ | 5 | f(1) |
| 13 | sei_message( ) | 5 | |
| 14 | } | | | all_view_combinations_in_au_flag equal to 1 indicates that the nested SEI message applies to all the view combinations of the access unit. all_view_combinations_in_au_flag 1. VUI parameters: As can be seen, shows that syntax of VUI parameter in the AVC standard has been modified by introducing an "if-then" statement that tests the variable "profile_idc". If "profile_idc" is equal to "MVC", then a loop if performed one or more times to test one or more points. If "profile_idc" is not equal to "MVC", then "AVC" is presumed to be the relevant standard, and an "else" is executed to test one point for AVC compliance (using existing AVC-HRD rules). Lines 30-58 are executed if the "profile_idc" is MVC, otherwise, lines 61-85 are executed. The variable "num_views_minus1" (line 30) provides the number of views in the loop. "view_id[i]" (line 32) provides the view_id of the ith view. Lines 33-58 provide syntaxes for the ith view. There can be up to M views (M=1 . . . N) in an MVC bitstream. This compares to a single checking point for an AVC bitstream.

2. A new SEI message, multiview nesting SEI, is defined in Table 6. A multiview nesting SEI message concerns an access unit. A multiview nesting SEI message contains one and only one SEI message, which is referred to as the nested SEI message. The scope to which the nested SEI message applies is indicated by the syntaxes from lines 2-7. "num_views_minus1" and "view_id[i]" share the same semantics of those in the VUI parameters.

3. Buffering period SEI message and the Picture timing SEI message can be as a SEI message payload embedded in multiview nesting SEI message. The syntax of Buffering period SEI and Picture timing SEI remain the same as in AVC. The Buffering period SEI message and the Picture timing SEI messages for the AVC compatible view shall not be nested in the multiview nesting SEI.

Figure 1:
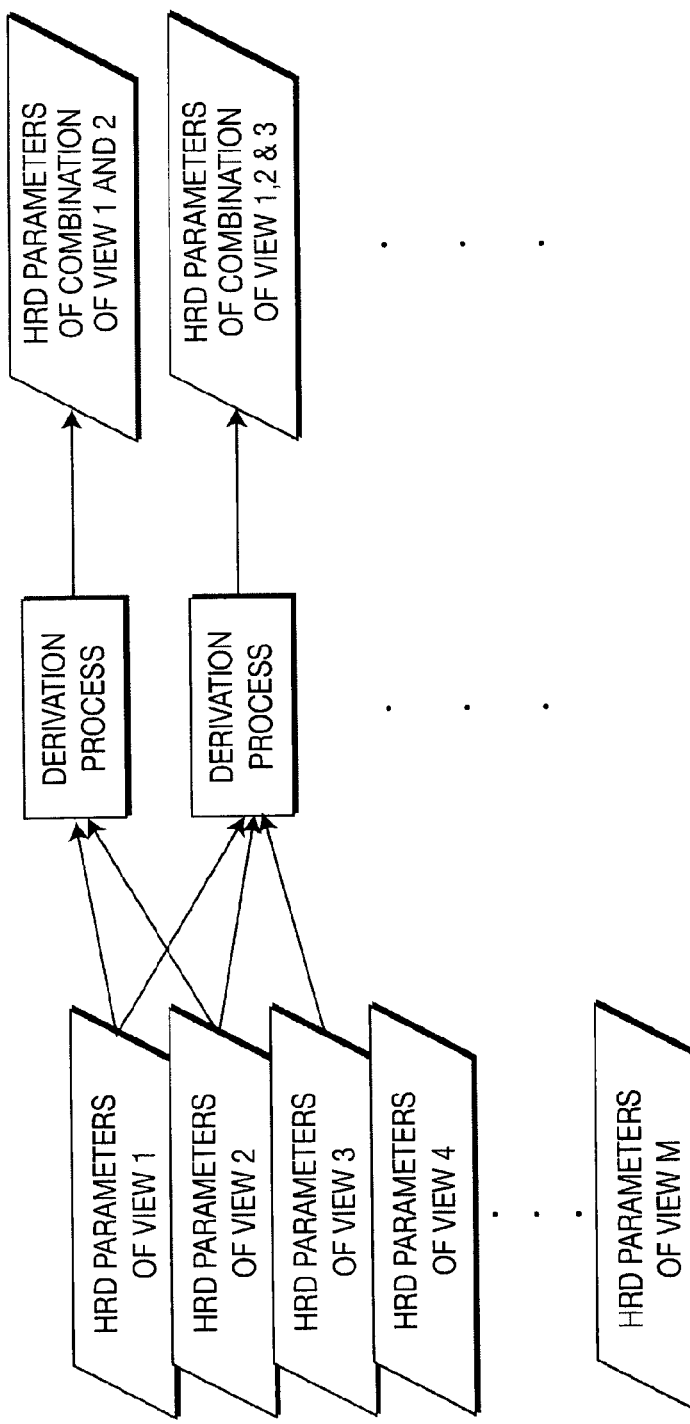
FIG. 1 shows HRD parameters of view combinations which are derived by the HRD parameters of single views.

The HRD parameters of each IOP (view combination) are derived by the HRD parameters of the views associated with the IOP. An example is given in FIG. 1.

TABLE 5

| | VUI parameters syntax | C | Descriptor |
|---|---|---|---|
| 1 | vui_parameters( ) { | | |
| 2 |   aspect_ratio_info_present_flag | 0 | u(1) |
| 3 |   if( aspect_ratio_info_present_flag ) { | | |
| 4 |     aspect_ratio_idc | 0 | u(8) |
| 5 |     if( aspect_ratio_idc = = Extended_SAR ) { | | |
| 6 |       sar_width | 0 | u(16) |
| 7 |       sar_height | 0 | u(16) |
| 8 |     } | | |
| 9 |   } | | |
| 10 |   overscan_info_present_flag | 0 | u(1) |
| 11 |   if( overscan_info_present_flag ) | | |
| 12 |     overscan_appropriate_flag | 0 | u(1) |
| 13 |   video_signal_type_present_flag | 0 | u(1) |
| 14 |   if( video_signal_type_present_flag ) { | | |
| 15 |     video_format | 0 | u(3) |
| 16 |     video_full_range_flag | 0 | u(1) |
| 17 |     colour_description_present_flag | 0 | u(1) |
| 18 |     if( colour_description_present_flag ) { | | |
| 19 |       colour_primaries | 0 | u(8) |
| 20 |       transfer_characteristics | 0 | u(8) |
| 21 |       matrix_coefficients | 0 | u(8) |
| 22 |     } | | |
| 23 |   } | | |
| 24 |   chroma_loc_info_present_flag | 0 | u(1) |
| 25 |   if( chroma_loc_info_present_flag ) { | | |
| 26 |     chroma_sample_loc_type_top_field | 0 | ue(v) |
| 27 |     chroma_sample_loc_type_bottom_field | 0 | ue(v) |
| 28 |   } | | |
| 29 |   if( profile_idc == 'MVC) { | | |
| 30 |     num_views_minus1 | 0 | ue(v) |
| 31 |     for( i = 0; i <= num_views_minus1; i++ ) { | | |
| 32 |       view_id[ i ] | 0 | u(5) |
| 33 |       timing_info_present_flag[ i ] | 0 | u(1) |
| 34 |       if( timing_info_present_flag[ i ] ) { | | |
| 35 |         num_units_in_tick[ i ] | 0 | u(32) |
| 36 |         time_scale[ i ] | 0 | u(32) |
| 37 |         fixed_frame_rate_flag[ i ] | 0 | u(1) |
| 38 |       } | | |
| 39 |       nal_hrd_parameters_present_flag[ i ] | 0 | u(1) |
| 40 |       if( nal_hrd_parameters_present_flag[ i ]) | | |
| 41 |         hrd_parameters( ) | | |
| 42 |       vcl_hrd_parameters_present_flag[ i ] | 0 | u(1) |
| 43 |       if( vcl_hrd_parameters_present_flag[ i ]) | | |
| 44 |         hrd_parameters( ) | | |
| 45 |       if( nal_hrd_parameters_present_flag[ i ] | | vcl_hrd_parameters_present_flag[ i ] ) | | |
| 46 |         low_delay_hrd_flag[ i ] | 0 | u(1) |
| 47 |       pic_struct_present_flag[ i ] | 0 | u(1) |
| 48 |       bitstream_restriction_flag | 0 | u(1) |
| 49 |       if( bitstream_restriction_flag ) { | | |
| 50 |         motion_vectors_over_pic_boundaries_flag | 0 | u(1) |
| 51 |         max_bytes_per_pic_denom | 0 | ue(v) |
| 52 |         max_bits_per_mb_denom | 0 | ue(v) |
| 53 |         log2_max_mv_length_horizontal | 0 | ue(v) |
| 54 |         log2_max_mv_length_vertical | 0 | ue(v) |
| 55 |         num_reorder_frames | 0 | ue(v) |
| 56 |         max_dec_frame_buffering | 0 | ue(v) |

TABLE 5-continued

VUI parameters syntax

| | | C | Descriptor |
|---|---|---|---|
| 1 | vui_parameters( ) { | | |
| 57 |     } | | |
| 58 |    } | | |
| 59 |  } | | |
| 60 | else{ | | |
| 61 |   timing_info_present_flag | 0 | u(1) |
| 62 |   if( timing_info_present_flag ) { | | |
| 63 |     num_units_in_tick | 0 | u(32) |
| 64 |     time_scale | 0 | u(32) |
| 65 |     fixed_frame_rate_flag | 0 | u(1) |
| 66 |   } | | |
| 67 |   nal_hrd_parameters_present_flag | 0 | u(1) |
| 68 |   if( nal_hrd_parameters_present_flag ) | | |
| 69 |     hrd_parameters( ) | | |
| 70 |   vcl_hrd_parameters_present_flag | 0 | u(1) |
| 71 |   if( vcl_hrd_parameters_present_flag ) | | |
| 72 |     hrd_parameters( ) | | |
| 73 |   if( nal_hrd_parameters_present_flag || vcl_hrd_parameters_present_flag ) | | |
| 74 |     low_delay_hrd_flag | 0 | u(1) |
| 75 |   pic_struct_present_flag | 0 | u(1) |
| 76 |   bitstream_restriction_flag | 0 | u(1) |
| 77 |   if( bitstream_restriction_flag ) { | | |
| 78 |     motion_vectors_over_pic_boundaries_flag | 0 | u(1) |
| 79 |     max_bytes_per_pic_denom | 0 | ue(v) |
| 80 |     max_bits_per_mb_denom | 0 | ue(v) |
| 81 |     log2_max_mv_length_horizontal | 0 | ue(v) |
| 82 |     log2_max_mv_length_vertical | 0 | ue(v) |
| 83 |     num_reorder_frames | 0 | ue(v) |
| 84 |     max_dec_frame_buffering | 0 | ue(v) |
| 85 |   } | | |
| 86 |  } | | |
| 87 | } | | | num_views_minus1 indicates the total number of views in the bitstream.

view_id[i] indicates the view_id of the ith view.

timing_info_present_flag[i] specifies the timing_info_present_flag value of the ith view.

num_units_in_tick[i] specifies the num_units_in_tick value of the ith view.

time_scale[i] specifies the time_scale value of the ith IOP.

fixed_frame_rate_flag[i] specifies the fixed_frame_rate_flag value of the ith view.

nal_hrd_parameters_present_flag[i] specifies the nal_hrd_parameters_present_flag value of the ith view.

vcl_hrd_parameters_present_flag[i] specifies the vcl_hrd_parameters_present_flag value of the ith view.

low_delay_hrd_flag[i] specifies the low_delay_hrd_flag value of the ith view.

pic_struct_present_flag[i] specifies the pic_struct_present_flag value of the ith view.

timing_info_present_flag, num_units_in_tick, time_scale, nal_hrd_parameters_present_flag, vcl_hrd_parameters_present_flag, low_delay_hrd_flag and pic_struct_present_flag have the same semantics as in AVC.

TABLE 6

Multiview nesting SEI message syntax

| | | C | Descriptor |
|---|---|---|---|
| 1 | multiview_nesting( payloadSize ) { | | |
| 2 |   all_views_in_au_flag | 5 | u(1) |
| 3 |   if(all_views_in_au_flag == 0) { | | |
| 4 |     num_views_minus1 | 5 | ue(v) |
| 5 |     for( i = 0; i <= num_views_minus1; i++ ) | | |
| 6 |       view_id[ i ] | 0 | u(5) |
| 7 |   } | | |
| 8 |   while( !byte_aligned( ) ) | | |
| 9 |     sei_nesting_zero_bit /* equal to 0 */ | 5 | f(1) |
| 10 |   sei_message( ) | 5 | |
| 11 | } | | | all_views_in_au_flag equal to 1 indicates that the nested SEI message applies to all the views of the access unit. all_views_in_au_flag equal to 0 indicates that the applicable scope of the nested SEI message is signaled by the syntax elements num_views_minus1 and view_id[i].

num_views_minus1 plus 1 indicates the number of views supported by the bitstream.

view_id[i] indicates the view_id of the ith view.

C. Specify HRD Rules for the Worst Case

In this category, it is proposed that MVC HRD only defines HRD constraints for the worst case of decoding M (M=1, . . . , N) views. The worst case may be defined as, for example, the case that requires the largest buffer size, longest delay, highest bitrate, most bits consumption of transmitting any M views, etc. So one can only define 1 set of HRD parameters for decoding each M views. That is, one defines a set of HRD parameters for the worst case single view, and a set of HRD parameters for the worst case 2-view combination, etc., up to a set of HRD parameters for the worst case N-1-view combination, and a set of HRD parameters for the (worst case) N-view combination. In total, only define N sets of HRD parameters, which are used to test HRD conformance for 1, 2, . . . , and up to N views. The disadvantage of this approach is that it requires sending higher constraints than what one particular case might need. But one can save the bits for sending all HRD parameters and one does not derive any parameters.

An embodiment of this solution is presented below.

Figure 12:
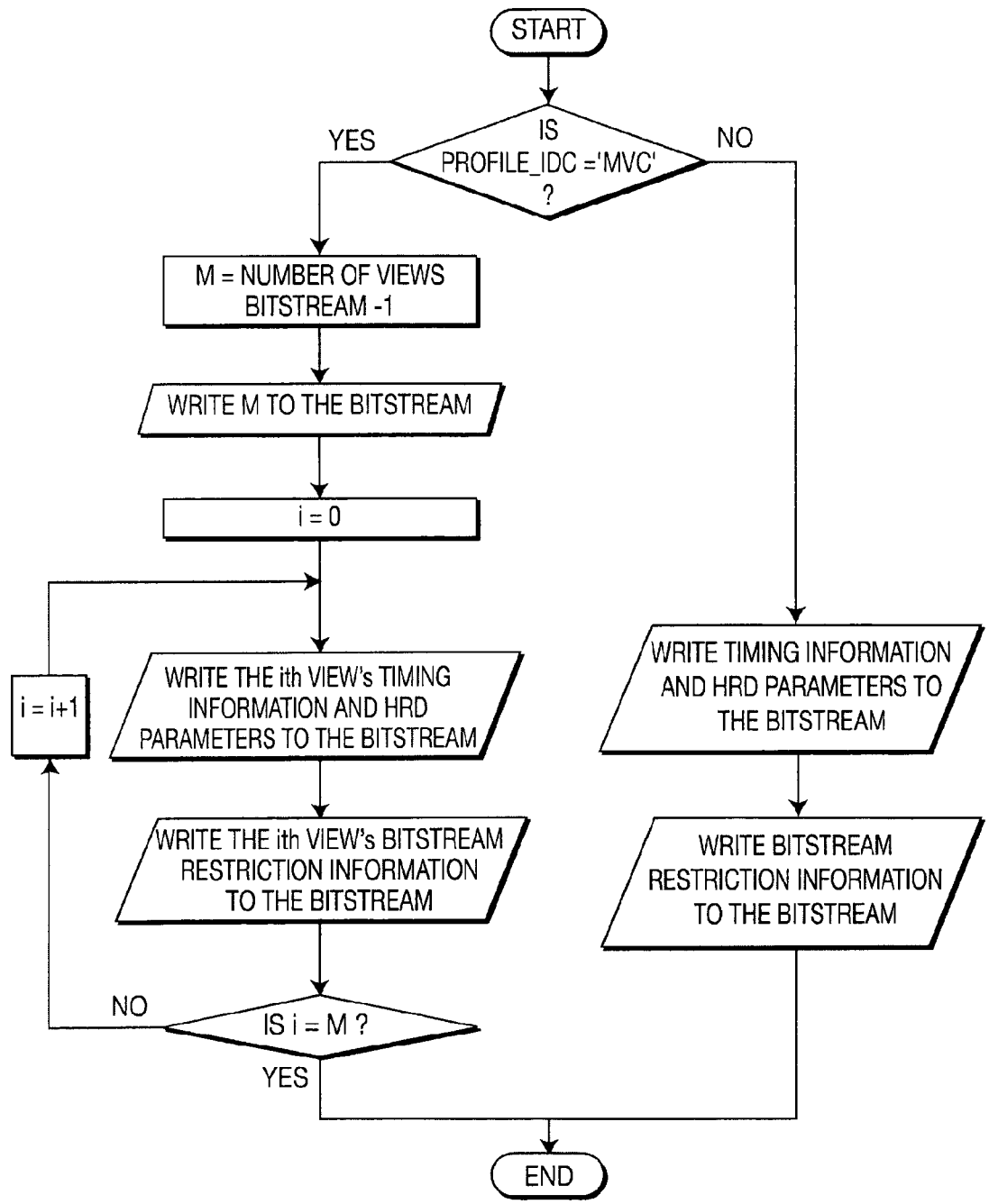
FIG. 12 shows Video Usability Information for MVC encoding process of category 3.
Figure 13:
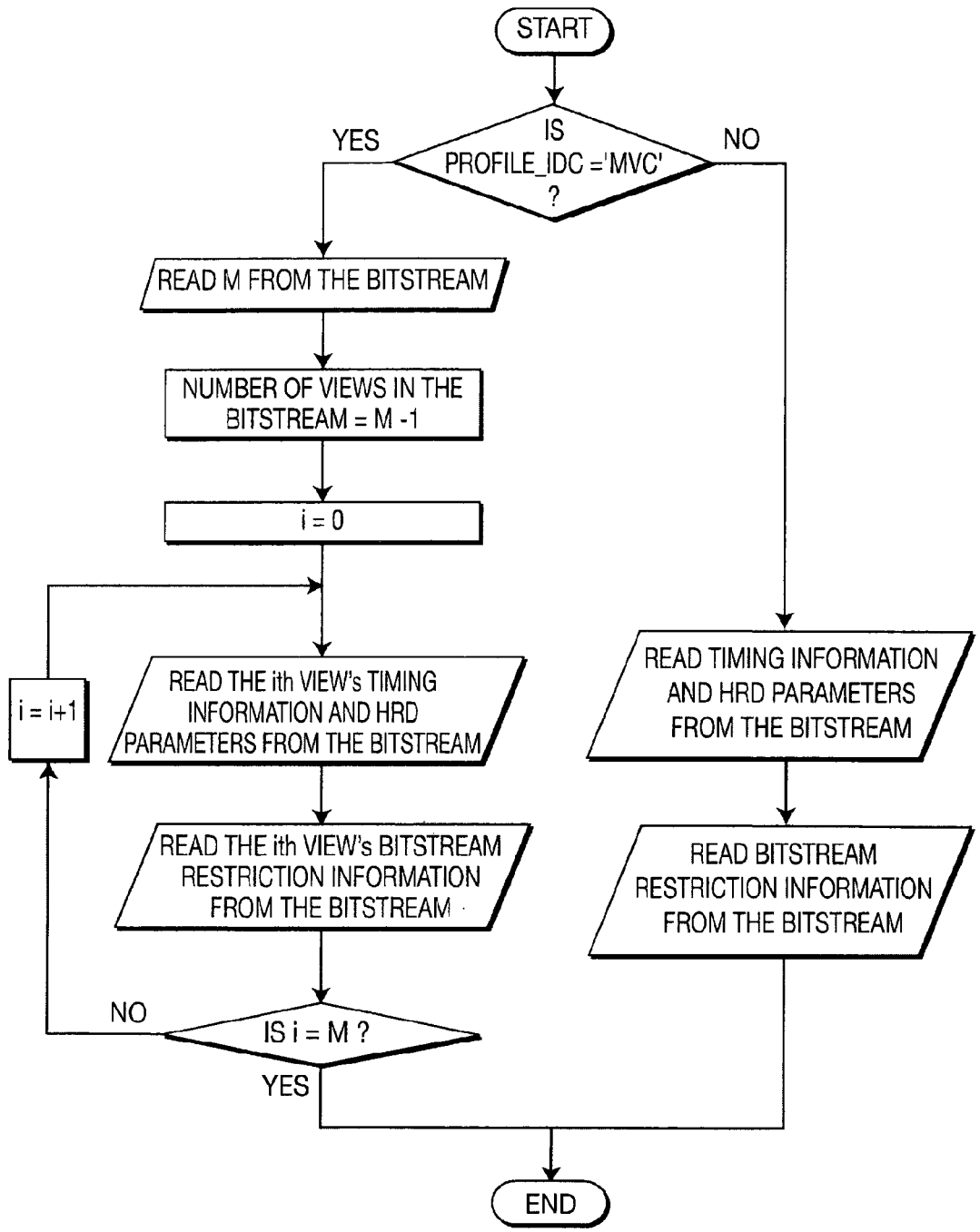
FIG. 13 shows Video Usability Information for MVC decoding process of category 3.

The maximum number of sets of HRD parameters sending is M, where M=1 . . . N. The flowchart of VUI encoding and decoding processes are shown in FIG. 12 and FIG. 13 respectively.

1. VUI parameters: As can be seen, Table 7 shows that syntax of VUI parameter in the AVC standard has been modified by introducing an "if-then" statement that tests the variable "profile_idc". If "profile_idc" is equal to "MVC", then a loop if performed one or more times to test one or more points. If "profile_idc" is not equal to "MVC", then "AVC" is presumed to be the relevant standard, and an "else" is executed to test one point for AVC compliance (using existing AVC-HRD rules). Lines 30-57 are executed if the "profile_idc" is MVC, otherwise, lines 60-84 are executed. The variable "num_views_minus1" (line 30) provides the number of views in the bitstream. Lines 32-56 provide syntaxes for HRD related parameters associated with the highest HRD constraints of decoding any i views of the (num_views_minus1+1) views.

Note that Table 7 differs from Table 5. See, for example, line 32 of Table 5, reciting "view_id[i]".

2. Buffering period SEI message and the Picture timing SEI message can be as a SEI message payload embedded in multiview nesting SEI message. The syntax of the multiview nesting SEI message can share the one defined in Table 6. The nesting Buffering period and Picture timing SEI message is associated with the highest HRD constraints of decoding any (num_views_minus1+1) views of total number of views sending in the bitstream. The syntax of Buffering period SEI and Picture timing SEI remain the same as in AVC. The Buffering period SEI message and the Picture timing SEI messages for the AVC compatible view shall not be nested in the multiview nesting SEI.

TABLE 7

| | VUI parameters syntax | | C | Descriptor |
|---|---|---|---|---|
| 1 | vui_parameters( ) { | | | |
| 2 |     aspect_ratio_info_present_flag | | 0 | u(1) |
| 3 |     if( aspect_ratio_info_present_flag ) { | | | |
| 4 |         aspect_ratio_idc | | 0 | u(8) |
| 5 |         if( aspect_ratio_idc = = Extended_SAR ) { | | | |
| 6 |             sar_width | | 0 | u(16) |
| 7 |             sar_height | | 0 | u(16) |
| 8 |         } | | | |
| 9 |     } | | | |
| 10 |     overscan_info_present_flag | | 0 | u(1) |
| 11 |     if( overscan_info_present_flag ) | | | |
| 12 |         overscan_appropriate_flag | | 0 | u(1) |
| 13 |     video_signal_type_present_flag | | 0 | u(1) |
| 14 |     if( video_signal_type_present_flag ) { | | | |
| 15 |         video_format | | 0 | u(3) |
| 16 |         video_full_range_flag | | 0 | u(1) |
| 17 |         colour_description_present_flag | | 0 | u(1) |
| 18 |         if( colour_description_present_flag ) { | | | |
| 19 |             colour_primaries | | 0 | u(8) |
| 20 |             transfer_characteristics | | 0 | u(8) |
| 21 |             matrix_coefficients | | 0 | u(8) |
| 22 |         } | | | |
| 23 |     } | | | |
| 24 |     chroma_loc_info_present_flag | | 0 | u(1) |
| 25 |     if( chroma_loc_info_present_flag ) { | | | |
| 26 |         chroma_sample_loc_type_top_field | | 0 | ue(v) |
| 27 |         chroma_sample_loc_type_bottom_field | | 0 | ue(v) |
| 28 |     } | | | |
| 29 |     if( profile_idc == 'MVC) { | | | |
| 30 |         num_views_minus1 | | 0 | ue(v) |
| 31 |         for( i = 0; i <= num_views_minus1; i++ ) { | | | |
| 32 |             timing_info_present_flag[ i ] | | 0 | u(1) |
| 33 |             if( timing_info_present_flag[ i ] ) { | | | |
| 34 |                 num_units_in_tick[ i ] | | 0 | u(32) |
| 35 |                 time_scale[ i ] | | 0 | u(32) |
| 36 |                 fixed_frame_rate_flag[ i ] | | 0 | u(1) |
| 37 |             } | | | |
| 38 |             nal_hrd_parameters_present_flag[ i ] | | 0 | u(1) |
| 39 |             if( nal_hrd_parameters_present_flag[ i ] ) | | | |
| 40 |                 hrd_parameters( ) | | | |
| 41 |             vcl_hrd_parameters_present_flag[ i ] | | 0 | u(1) |
| 42 |             if( vcl_hrd_parameters_present_flag[ i ]) | | | |
| 43 |                 hrd_parameters( ) | | | |
| 44 |             if( nal_hrd_parameters_present_flag[ i ] | | vcl_hrd_parameters_present_flag[ i ] ) | | | |
| 45 |                 low_delay_hrd_flag[ i ] | | 0 | u(1) |

TABLE 7-continued

VUI parameters syntax

| | | C | Descriptor |
|---|---|---|---|
| 1 | vui_parameters( ) { | | |
| 46 |         pic_struct_present_flag[ i ] | 0 | u(1) |
| 47 |         bitstream_restriction_flag | 0 | u(1) |
| 48 |         if( bitstream_restriction_flag ) { | | |
| 49 |             motion_vectors_over_pic_boundaries_flag | 0 | u(1) |
| 50 |             max_bytes_per_pic_denom | 0 | ue(v) |
| 51 |             max_bits_per_mb_denom | 0 | ue(v) |
| 52 |             log2_max_mv_length_horizontal | 0 | ue(v) |
| 53 |             log2_max_mv_length_vertical | 0 | ue(v) |
| 54 |             num_reorder_frames | 0 | ue(v) |
| 55 |             max_dec_frame_buffering | 0 | ue(v) |
| 56 |         } | | |
| 57 |     } | | |
| 58 | } | | |
| 59 | else{ | | |
| 60 |     timing_info_present_flag | 0 | u(1) |
| 61 |     if( timing_info_present_flag ) { | | |
| 62 |         num_units_in_tick | 0 | u(32) |
| 63 |         time_scale | 0 | u(32) |
| 64 |         fixed_frame_rate_flag | 0 | u(1) |
| 65 |     } | | |
| 66 |     nal_hrd_parameters_present_flag | 0 | u(1) |
| 67 |     if( nal_hrd_parameters_present_flag ) | | |
| 68 |         hrd_parameters( ) | | |
| 69 |     vcl_hrd_parameters_present_flag | 0 | u(1) |
| 70 |     if( vcl_hrd_parameters_present_flag ) | | |
| 71 |         hrd_parameters( ) | | |
| 72 |     if( nal_hrd_parameters_present_flag \|\| vcl_hrd_parameters_present_flag ) | | |
| 73 |         low_delay_hrd_flag | 0 | u(1) |
| 74 |     pic_struct_present_flag | 0 | u(1) |
| 75 |     bitstream_restriction_flag | 0 | u(1) |
| 76 |     if( bitstream_restriction_flag ) { | | |
| 77 |         motion_vectors_over_pic_boundaries_flag | 0 | u(1) |
| 78 |         max_bytes_per_pic_denom | 0 | ue(v) |
| 79 |         max_bits_per_mb_denom | 0 | ue(v) |
| 80 |         log2_max_mv_length_horizontal | 0 | ue(v) |
| 81 |         log2_max_mv_length_vertical | 0 | ue(v) |
| 82 |         num_reorder_frames | 0 | ue(v) |
| 83 |         max_dec_frame_buffering | 0 | ue(v) |
| 84 |     } | | |
| 85 | } | | |
| 86 | } | | | num_views_minus1 indicates the total number of views in the bitstream.

timing_info_present_flag[i] specifies the timing_info_present_flag value for decoding i views.

num_units_in_tick[i] specifies the num_units_in_tick value for decoding i views.

time_scale[i] specifies the time_scale value for decoding i views.

fixed_frame_rate_flag[i] specifies the fixed_frame_rate_flag value for decoding i views.

nal_hrd_parameters_present_flag[i] specifies the nal_hrd_parameters_present_flag value for decoding i views.

vcl_hrd_parameters_present_flag[i] specifies the vcl_hrd_parameters_present_flag value for decoding i views.

low_delay_hrd_flag[i] specifies the low_delay_hrd_flag value for decoding i views.

pic_struct_present_flag[i] specifies the pic_struct_present_flag value for decoding i views.

The parameters timing_info_present_flag, num_units_in_tick, time_scale, nal_hrd_parameters_present_flag, vcl_hrd_parameters_present_flag, low_delay_hrd_flag and pic_struct_present_flag have the same semantics as in AVC.

FIGS. 4 through 13 show various flow charts for writing or reading the particular syntax that is identified.

Several implementations are described herein that, for example, provide rules for writing and/or reading a description of an HRD for MVC. This allows an HRD to be defined and used in MVC.

However, features and aspects of described implementations may also be adapted for other implementations. For example, as indicated above, an HRD may be provided using the above features for other standards. Additionally, an HRD may be provided for MVC using variations of the embodiments described above. Such variations may include, for example, implementations that use other high-level syntax, use syntax that is not high level, provide HRD parameters for other IOPs. Accordingly, although implementations described herein may be described in the context of high-level syntax for H.264, implementing one of the three principal implementations described herein, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation or features discussed may also be implemented in other forms (for example, an apparatus or program). An apparatus may be implemented in, for example, appropriate hardware, software, and firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD, or other computer readable storage device, or an integrated circuit.

As should be evident to one of skill in the art, implementations may also produce a signal formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax written by a described embodiment.

Additionally, many implementations may be implemented in either, or both, an encoder and a decoder.

Further, other implementations are contemplated by this invention. For example, additional implementations may be created by combining, deleting, modifying, or supplementing various features of the disclosed implementations.

The previous description provides some of the various implementations. It is not intended to be exhaustive but merely to provide a short description of a small number of the many possible implementations.

The invention claimed is:

1. A multiview video encoder, comprising:
a processing unit implementing a hypothetical reference decoder ("HRD") for multiview video coding (MVC), wherein the processing unit specifies HRD parameters and bitstream restriction information for each interoperability point in MVC, and wherein the processing unit encodes the HRD parameters and the bitstream restriction information into a bitstream.

2. The multiview video encoder of claim 1, wherein the HRD parameters and the bitstream restriction information are defined in high level syntax.

3. The multiview video encoder of claim 1, wherein the bitstream restriction information comprises at least one of a motion_vectors_over_pic_boundaries_flag syntax element, a max_bytes_per_pic_denom syntax element, a max_bits_per_mb_denom syntax element, a log2_max_mv_length_horizontal syntax element, a log2_max_mv_length_vertical syntax element, a num_reorder_frames syntax element, and a max_dec_frame_buffering syntax element.

4. A multiview video encoder, comprising:
a processing unit implementing a hypothetical reference decoder for multiview video coding, wherein the processing unit specifies the HRD parameters and the bitstream restriction information only for a set of interoperability points, and other sets are derived from the specified set, and wherein the processing unit encodes the HRD parameters and the bitstream restriction information into a bitstream.

5. The multiview video encoder of claim 4, wherein the processing unit specifies the HRD parameters and the bitstream restriction information only for decoding a single view, and derives the HRD parameters and the bitstream restriction information for decoding more than one view from those of the single view.

6. The multiview video encoder of claim 4, wherein the bitstream restriction information comprises at least one of a motion_vectors_over_pic_boundaries_flag syntax element, a max_bytes_per_pic_denom syntax element, a max_bits_per_mb_denom syntax element, a log2_max_mv_length_horizontal syntax element, a log2_max_mv_length_vertical syntax element, a num_reorder_frames syntax element, and a max_dec_frame_buffering_syntax element.

7. A multiview video encoder, comprising:
a processing unit implementing a hypothetical reference decoder for multiview video coding, wherein the processing unit specifies the HRD parameters and the bitstream restriction information only for the worst case of decoding any number of views, the worst case corresponding to at least one of a largest buffer size, longest delay, highest bitrate, and most bit consumption required for decoding the any number of views, and wherein the processing unit encodes the HRD parameters and the bitstream restriction information into a bitstream.

8. The multiview video encoder of claim 7, wherein the bitstream restriction information comprises at least one of a motion_vectors_over_pic_boundaries_flag syntax element, a max_bytes_per_pic_denom syntax element, a max_bits_per_mb_denom syntax element, a log2_max_mv_length_horizontal syntax element, a log2_max_mv_length_vertical syntax element, a num_reorder_frames syntax element, and a max_dec_frame_buffering syntax element.

* * * * *